United States Patent

[11] 3,627,375

| [72] | Inventor | Goran Rosen<br>Radagatan 5, Lidkoping, Sweden |
|---|---|---|
| [21] | Appl. No. | 874,897 |
| [22] | Filed | Nov. 7, 1969 |
| [45] | Patented | Dec. 14, 1971 |
| [32] | Priority | Nov. 15, 1968 |
| [33] | | Sweden |
| [31] | | 15516/68 |

[54] DETACHABLE VERTICAL STANCHION FOR VEHICLE PLATFORMS PROVIDED WITH A SUPPORT FOR A TARPAULIN COVER
6 Claims, 5 Drawing Figs.

[52] U.S. Cl. .................................................. 296/36,
105/381, 287/64, 287/103, 296/43
[51] Int. Cl. ...................................................... B62d 25/00
[50] Field of Search ............................................ 296/14, 36,
43, 100, 104, 105; 280/143, 145, 147; 105/381,
387; 287/99, 64, 103

[56] References Cited
UNITED STATES PATENTS

| 1,804,420 | 5/1931 | Kelley .......................... | 287/64 X |
| 2,711,805 | 6/1955 | Hallead ........................ | 287/64 X |
| 3,097,880 | 7/1963 | Reader ......................... | 296/36 |
| 3,374,029 | 3/1968 | Barker.......................... | 296/43 X |

FOREIGN PATENTS

| 121,150 | 3/1948 | Sweden ........................ | |
| 124,898 | 3/1928 | Switzerland.................. | |

*Primary Examiner*—Benjamin Hersh
*Assistant Examiner*—Leslie J. Paperner
*Attorney*—Holman, Glascock, Downing & Seebold ABSTRACT: In order to facilitate the loading and unloading of vehicles having a load platform provided with a tarpaulin cover carried by a pillar structure in which each pillar thereof is composed of a lower stanchion and an upper support rod interconnected by an open hinge in such a manner that the rod and the stanchion may be swung into an aligned position. The hinge is composed of a bearing journal at the free end of either the stanchion or the rod, and a bearing cup is located some distance from the free end of the rod or the stanchion, respectively, with the component provided with the bearing cup having a wall designed to guide the bearing towards the cup during an initial part of the fitting together operation.

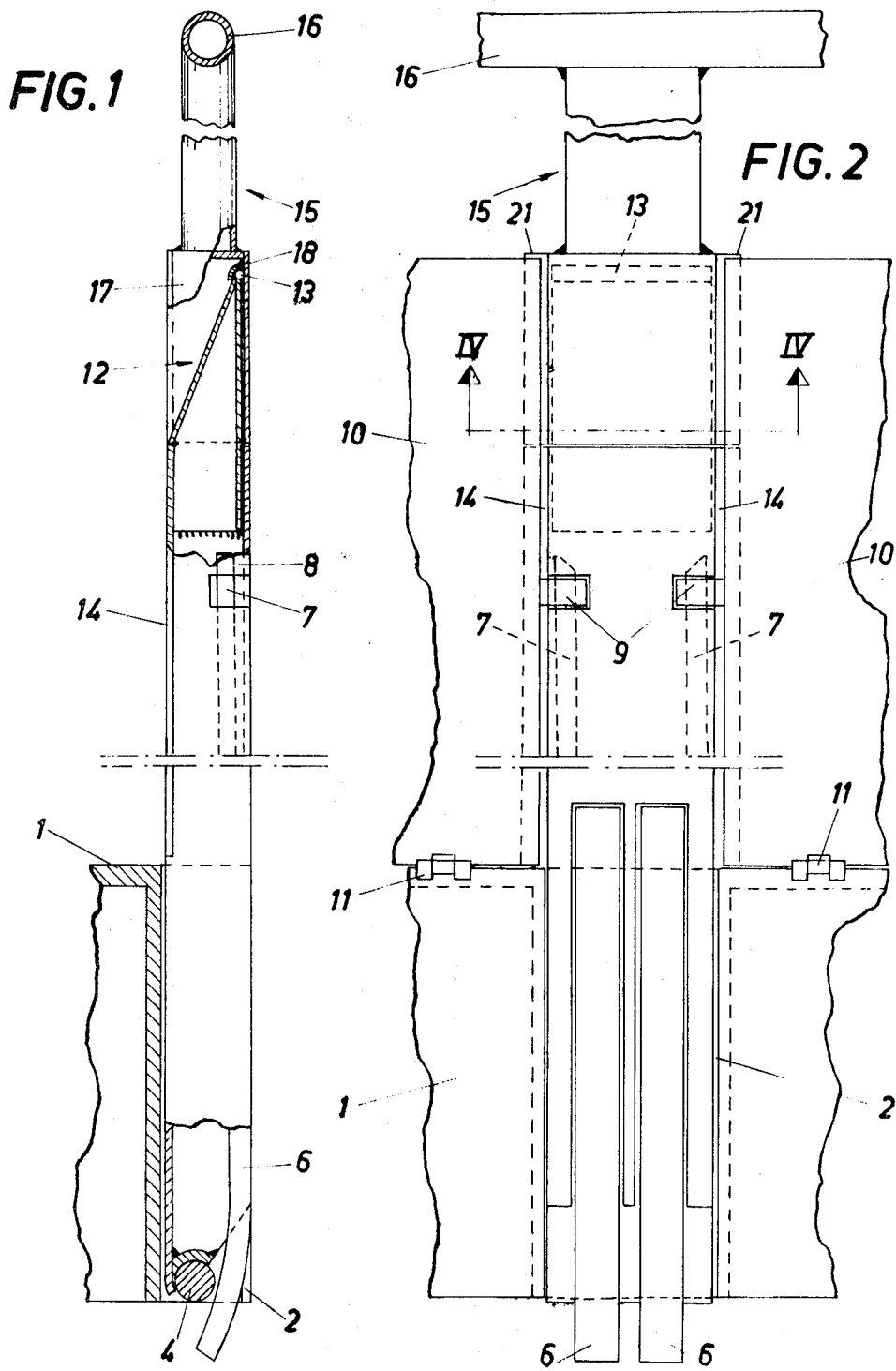

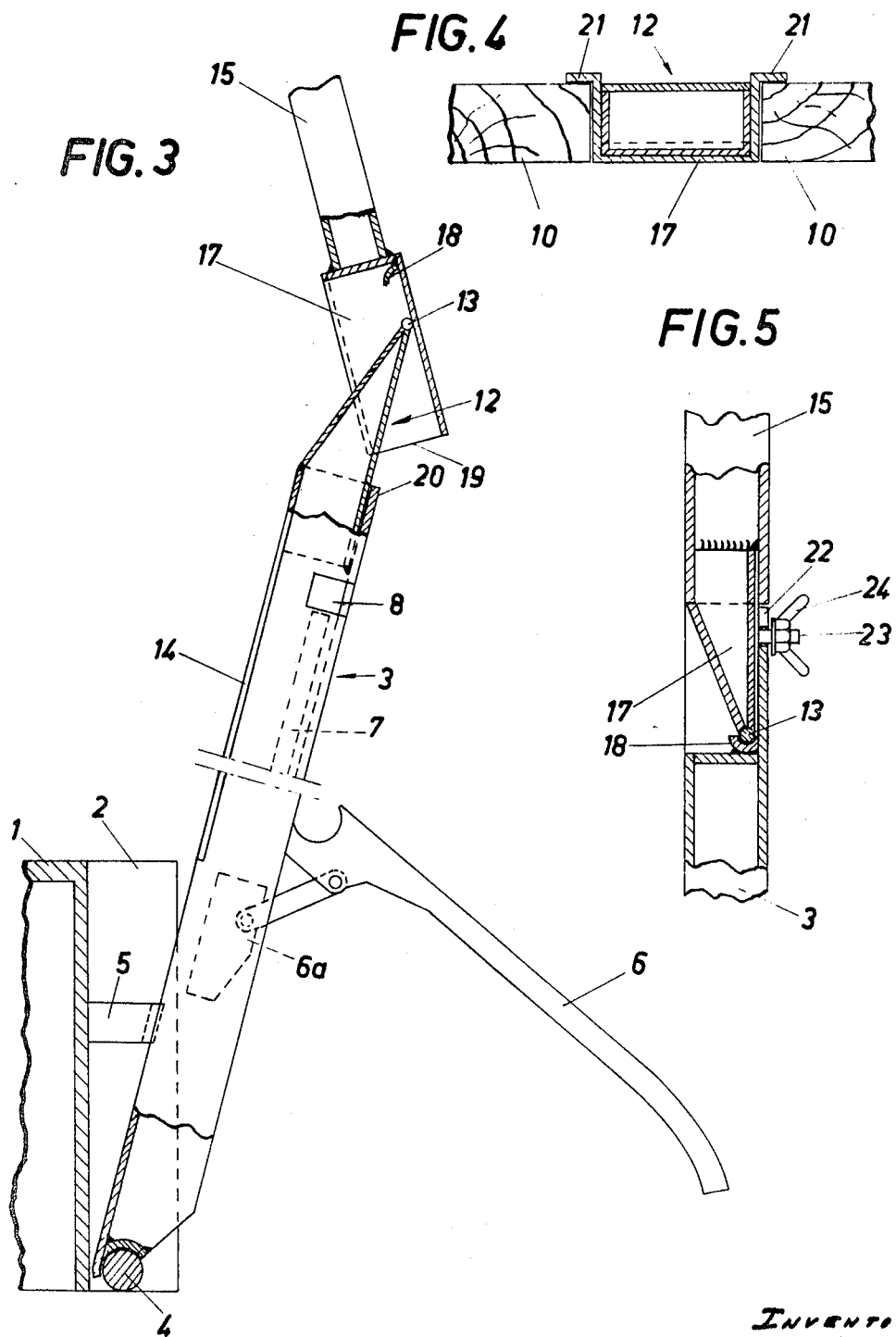

DETACHABLE VERTICAL STANCHION FOR VEHICLE PLATFORMS PROVIDED WITH A SUPPORT FOR A TARPAULIN COVER

CROSS-REFERENCE TO RELATED APPLICATION

One manner of mounting the stanchion on the load carrying platform is described in my copending U.S. application Ser. No. 758,876, now U.S. Pat. No. 3,558,182 dated Jan. 26, 1971.

BACKGROUND OF THE INVENTION

The present invention relates to detachable vertical stanchions for the load platform of vehicles provided with a tarpaulin cover or the like, with the stanchions being provided with means for pivotable mounting and locking in relation to the platform, and furthermore being provided with at least one locking member for securing a sideboard to the stanchions.

Especially with road trucks, the stanchions, which are used to support the sideboards, are often designed to carry support rods for a tarpaulin cover. When loading and unloading such a truck, it is often necessary to remove at least one of the stanchions, which means that the corresponding fitting for the tarpaulin support cover is removed. Usually, the platform is fully loaded close to the sideboards and it is therefore difficult for the person who has to lift the support rod out of its fitting to obtain a good foothold. The lifting of the support rod implies a considerable amount of work. The weight of the tarpaulin allotted to each rod may be as much as 50 kilos and since the tarpaulin interconnects several support rods, the weight allotted to neighboring rods will have to be taken into account. In order to provide a satisfactory governing of the rod, this is often pushed about 15 centimeters down into a sleeve at the stanchion, which means that the rod will have to be lifted this distance in order to free it from the stanchion.

SUMMARY OF THE INVENTION

The object of the present invention is to provide an arrangement which will eliminate the hard work of removing the support rod, and which is of simple design making it inexpensive to manufacture and easy to handle. The invention is characterized by a bearing journal and a bearing cup together forming an open hinge fitted to the meeting ends of the stanchion and the support rod, respectively, at the side thereof facing the platform, in such a manner that the rod may be swung to a position in which it is aligned with the stanchion to form a pillar, with the bearing journal being mounted at the free end of one of the pillar portions and the bearing cup being mounted at some distance from the free end of the other pillar portion, which is provided with a wall forming a guide towards the bearing cup, and means for locking the rod in relation to the stanchion in said position.

BRIEF DESCRIPTION OF THE DRAWINGS

FIG. 1 is a view partly in elevation, and partly in section of a stanchion together with a rod connected thereto, FIG. 2 shows the same assemblage as viewed at right angles to FIG. 1, FIG. 3 shows a view corresponding to FIG. 1, but in which the stanchion and the rod are about to be disconnected, FIG. 4 is a section along line IV—IV in FIG. 2, and FIG. 5 is a fragmentary view longitudinal section through a modified embodiment of the invention.

DESCRIPTION OF THE PREFERRED EMBODIMENT

In the drawings numeral 1 denotes the loading platform of a road truck, a trailer, a railway car or the like. The edge portions of this platform are provided with a number of recesses 2, into each of which a tubular stanchion denoted generally 3 may be fitted. The lower end of each stanchion will then be pivotably mounted about a journal rod or shaft 4, which extends across the lower part of each recess 2 at the platform. Each recess is furthermore provided with a staple 5, which is designed to cooperate with a wedge 6a within the stanchion 3, and the wedge is operated by means of a lever 6. This lever also operates a locking member 7 adapted to secure at least one sideboard 10 to the stanchion. The locking member for each sideboard comprises a vertically displaceable rod, which in locking position, (FIG. 2) extends across an opening 8 in the stanchion. A staple 9 at a suitable portion of the sideboard 10 will fit into this opening to be engaged by the locking member. The lower edge of each sideboard is pivotably mounted at the platform 1 by means of hinges 11. The upper part of the stanchion carries an arm 12, which is welded to the inside of the stanchion in such a manner that part of the arm will be enclosed by the sidewalls of the stanchion. A bearing journal 13 designed as a transversely arranged member is fitted to the free end of arm 12. Abutments 14 for the sideboards 10 are attached to the sides of the stanchion facing the platform, just below the point of attachment of the arm 12 thereto, and downwardly to the level of the platform.

The tarpaulin cover is not shown in the drawings and of the frame structure carrying the cover only a vertical support rod 15 is shown. The rod 15 is provided at its upper end with a horizontal transom 16. A lower portion 17 of the support rod 15 has generally the same cross section as the stanchion 3 except that it lacks the sidewall corresponding to the back side of the stanchion. The lower portion 17 of the rod thus has essentially a U-shaped cross section, and at a distance from its lower end, it is provided with a bearing cup 18 designed for cooperation with the bearing journal 13 at the upper end of the arm 12. This bearing cup is located at a distance from the lower end of the rod corresponding to the free length of the arm 12. The lower portion 17 of the rod 15 is designed in such a manner that lower edge 19 thereof preferably will rest against upper edge 20 of the stanchion 3, when the bearing journal 13 rests in the bearing cup 18.

The free edges of the legs of the U-shaped portion 17 are provided with abutments 21 corresponding to the abutments 14 at the stanchion in such a manner that the first mentioned abutments will form extensions of the abutments 14.

The combined length of the stanchion and the arm 12 is approximately the same as the height of the sideboard 10, whereby the upper edge of the sideboard 10 in mounted position will extend approximately level with the upper end of portion 17 of the rod.

The arrangement works in the following manner.

It is presupposed that the support frame for the tarpaulin cover is mounted and that one of the support rods 15 is not fitted into a stanchion. In a large size road truck, the lower portion end 17 of the rod 15 will be located at such a height above ground level, that a man can hardly reach it. When fitting the parts, the bearing cup 18 at the lower portion 17 of the rod 15 is caught by the upper end of the stanchion 3 and brought into engagement with the bearing journal 13 at the free end of the arm 12. Thereafter, the stanchion is swung outwardly sufficiently to make it possible to place the lower end of the stanchion on the journal rod 4. Thereupon, the stanchion and the rod are swung toward the load platform whereby the rod is lifted upwardly, and when the stanchion has been swung into its recess 2 at the platform, the lever 6 is operated so that the wedge 6a is pushed into its staple 5. The stanchion will thereby be locked in relation to the platform. In this position, the rod 15 is aligned with the stanchion 3, and when the sideboards 10 thereafter are swung up against the stanchion they will rest against the abutments 14 and 21. When the lever is pushed completely down to the position shown in FIGS. 1 and 2, the locking members 7 will pass through the staple 9 extending through the opening 8 in the stanchion. Hence the stanchion will be locked in relation to the platform and the stanchion, the sideboards and the support rod will be locked in relation to each other.

In the embodiment shown in FIG. 5, the lower portion 17 of the support rod 15 is designed in the same manner as the arm 12 in the FIGS. 1–4, i.e., the bearing journal 13 is fitted to the rod. This cooperates with a bearing cup 18 mounted some distance from the upper edge of the stanchion and enclosed on three sides by the walls thereof.

Only part of the upper end of the stanchion, which faces towards the platform, is open, i.e., lacks the back wall.

The front side of the stanchion 3 is, in this form, provided with a slot 22 directly opposite to which a threaded bolt 23 is fitted to the lower portion 17 of the rod 15. This threaded bolt cooperate with a nut 24, by means of which the stanchion and the rod may be locked in relation to each other so that no swinging moment in respect of the journal 13–18 may occur.

The embodiments shown and described in relation to the drawings are to be regarded as examples only, and many variations within the scope of the appended claims are possible. One sidewall in the end part, of the pillar portion carrying the bearing cup is directly aligned with the outward edge of the bearing cup and will thus act as a guide for the bearing journal when the pillar portions are fitted together.

What I claim is:

1. A detachable structure for supporting a tarpaulin cover for a load-carrying platform of a vehicle truck, comprising a plurality of stanchion components adapted to be detachably connected to the edges of the platform for securing sideboards thereto, and each stanchion component providing a fitting for a tarpaulin-carrying rod component, each of said stanchion components and the attached rod components, when in aligned position, constituting a pillar structure, the improvement of an open hinge at the meeting ends of the stanchion component and the rod component, said open hinge including a bearing journal at the free end of one of the components and a bearing cup located some distance from the free end of the other component to permit the rod component to be swung to a position in which the rod component is aligned with the stanchion component, a wall at said rod component between the free end thereof and the bearing cup to define a guide for the bearing journal towards the latter, the stanchion component and the rod component having essentially the same cross-sectional shape, and means for locking the rod component in relation to the stanchion component in the aligned position comprising abutment ledges for the sideboards at the stanchion component and at the rod component in such a manner that said components will be locked in relation to each other by the sideboards engaging the ledges, the stanchion component being of such length that the bearing journal, when the stanchion component and rod component are in aligned and locked relation, will be approximately level with the upper edge of the sideboard.

2. A detachable structure for supporting a tarpaulin cover for a load-carrying platform of a vehicle truck, comprising a plurality of stanchion components adapted to be detachably connected to the edges of the platform for securing sideboards thereto, and each stanchion component providing a fitting for a tarpaulin carrying rod component, each of said stanchion components and the attached rod components, when in aligned position, constituting a pillar structure, the improvement of an open hinge at the meeting ends of the stanchion component and rod component, said open hinge including a bearing journal at the upper end of the stanchion component and a bearing cup located some distance from the lower end of the rod component, the lower end of the rod component being substantially of U-shaped cross section to enclose the upper end of the stanchion component when the rod component is swung to a position in which the rod component is aligned with the stanchion component and rest against a shoulder thereon in the aligned position, a wall at the stanchion component between the upper end thereof and the bearing cup to define a guide for the bearing journal towards the latter, and means for locking the rod component in relation to the stanchion component in the aligned position, the stanchion component being of such length that the bearing journal, when the stanchion component and the rod component are in aligned and locked position with the sideboard engaging the components, will be approximately level with the upper edge of the sideboard.

3. The detachable structure as claimed in claim 2, in which the upper end of the stanchion component carries an arm to the free end of which the bearing journal is secured, and the bearing cup being located a distance from the lower end of the rod component corresponding to the free length of the arm.

4. The detachable structure as claimed in claim 2, in which the upper end of the stanchion component is of substantially U-shaped cross section to enclose the lower end of the rod component and provide the shoulder against which the rod component rests in the aligned position of the components.

5. The detachable structure as claimed in claim 2 including further means to maintain said components in aligned position when the sideboards are out of engagement with said components.

6. The detachable structure as claimed in claim 5 in which said further means include a threaded bolt secured to one of the components a distance from the bearing journal and a slot in the other component in a juxtaposed position a distance from the bearing cup and a nut cooperable with the bolt to lock the stanchion component and the rod component in aligned position.

* * * * *